Aug. 15, 1933.  C. E. JOHNSON  1,922,369

PISTON RING SPREADER

Filed Sept. 17, 1930

Inventor
Charles E. Johnson
Linrance and Van Antwerp
Attorneys

Patented Aug. 15, 1933

1,922,369

UNITED STATES PATENT OFFICE 1,922,369

PISTON RING SPREADER

Charles E. Johnson, Muskegon, Mich., assignor to The Piston Ring Company, Muskegon, Mich., a Corporation of Michigan Application September 17, 1930
Serial No. 482,447

3 Claims. (Cl. 309—43)

This invention relates to piston rings, more particularly to the utilization of a plurality of ribbon spreaders between the bottoms of piston ring grooves in a piston and the inner curved sides of rings located in said grooves.

It has been common practice to locate a spreader in a piston ring groove between the bottom thereof and the inner curved side of a piston ring located in the groove, the spreader contacting alternatively at spaced points with the bottom of the groove and the inner side of the ring. The spreader, like the piston ring, is parted at one side and at the parting the spreader is more or less weak and ineffective. At the same time, in order for the spreader to be effective at the other portions of the ring, the ribbon metal from which it is made must be relatively strong so that at the points at which the spreader bears against the inner side of the ring there is exerted a considerable outward pressure against the ring which is liable to be too great at points substantially diametrically opposite the parting in the spreader.

With my invention it is designed that a plurality of the spreaders may be located within a ring groove between the bottom thereof and the inner side of the ring, in which case the metal from which the spreader is made will be of much less thickness than when a single one is used and the partings in the different spreaders can be located, when two of the spreaders are used, 180° apart, and if three are used, the partings will be substantially 120° apart, thereby obviating almost completely the weakness and lack of pressure which occurs at the parting where a single spreader is used.

Figure 1:
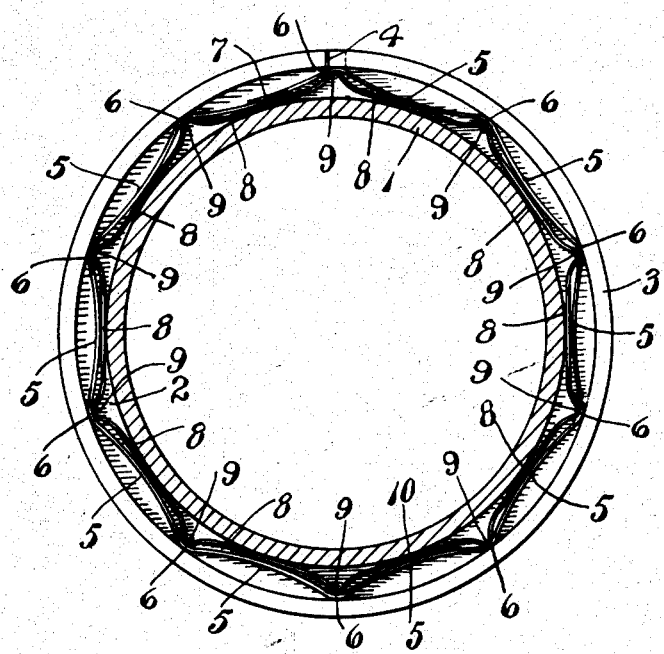
Figure 2:
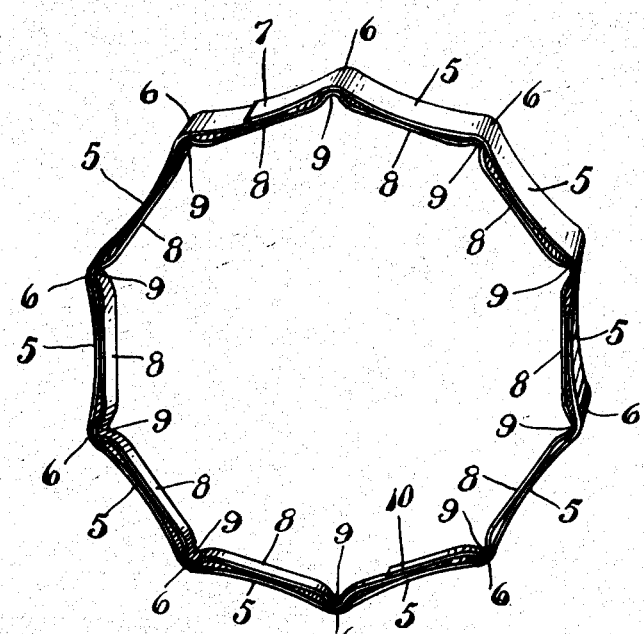

My invention, therefore, is directed to the use of a plurality of spreaders and the nesting of the same one within the other and a separation of the partings thereof properly from each other so as to obtain a much better effect in uniform pressures of the piston rings with which the spreaders are used. An understanding of the invention may be had from the following description, taken in connection with the accompanying drawing, in which, Fig. 1 is a partial section and plan view illustrative of the use of the plurality of spreaders with a piston ring located in a ring groove and Fig. 2 is a perspective view showing two of the spreaders in assembled nested relation.

Like reference characters refer to like parts in the figures of the drawing.

The piston 1, shown in cross section, is indicated as having a ring groove 2 therein and a piston ring 3 located in the outer portion of the groove. The piston ring is of the outwardly expanding type having a parting 4 at one side. The space between the inner side of the ring and the bottom of the ring groove, in Fig. 1, is exaggerated for a better disclosure of the invention, though in practice the depth of the ring groove will not be appreciably, if any, greater than what is normally used.

In the drawing two ring spreaders are shown in nested relation, each being of ribbon stock and polygonal in shape, the outer spreader having alternate depressions 5 and raised portions 6 with the parting 7 at one side of the ring between two of the raised portions 6. Within this outer spreader a second spreader is used of very similar, if not identical, form having likewise alternate depressed portions 8 and raised portions 9 and a parting at 10 which is located diametrically opposite the parting 7 of the outer spreader. The raised portions 9 of the inner spreader, which raised portions 9 may be of sharper construction than the adjacent raised portions 6 of the outer ring spreader, bear against the inner sides of the raised portions 6 of the outer spreader and the depressed portions 5 and 8 of the spreaders are spaced slightly from each other except at their middle portions as shown. Thus a desirable slight alining movement may occur between the spreaders.

When located in a piston ring groove, within a piston ring, the inner sides of the depressed portions 8 of the inner spreader bear against the bottom of the ring groove at spaced apart points and the outer sides of the raised portions 6 of the outer spreader bear against substantially equally separated points of the inner side of the ring 3. This provides a substantially equal bearing contact of the outer curved side of the ring against the walls of the cylinder in which the ring is located. There is no weak and ineffective section of the spreader due to the parting as is the case when a single one is used, and the flexibility of the two or more nesting spreaders of thin material is greater than that of the single stiffer spreader of double or triple thickness, whereby an effect of better uniformity of bearing of the piston ring against the inner walls of the cylinder is attained.

The invention is one of practical value and has so proved in use. The claims appended hereto define the invention, which is to be considered comprehensive of all forms of structure coming within their scope.

I claim:

1. A piston having a ring groove therein, a parted piston ring located in the groove, a plurality of spreaders located in said groove between the bottom thereof and the inner side of the ring, said spreaders being shaped to provide alternate raises and depressions in the length of each spreader, the innermost spreader having the inner sides of its depressions contacting against the bottom of the ring groove, and the outermost of said spreaders having the outer points of its raised portions bearing against the inner side of the piston ring, said inner spreader having its raises nesting in the raises of the outer spreader, said raises of the inner spreader being of sharper construction for the purpose described.

2. A plurality of nested spreaders each of said spreaders being of thin ribbon metal and provided with raised outwardly projecting portions, between which are inwardly extending depressions, the raised portions and the depressed portions of the nested spreaders engaging with each other but said spreaders being slightly spaced apart at intermediate points.

3. A plurality of nested spreaders, each of said spreaders being of thin ribbon metal and having raised outwardly projecting portions, between which are inwardly extending depressions, the raised portions and the depressed portions of the nested spreaders engaging with each other, said spreaders being free to slide slightly circumferentially with respect to each other.

CHARLES E. JOHNSON.